United States Patent 3,544,588
Patented Dec. 1, 1970

3,544,588
ORGANOTIN IMIDES
Pasquale P. Minieri, Woodside, N.Y., assignor to Tenneco Chemicals, Inc., a corporation of Delaware
No Drawing. Filed Oct. 11, 1968, Ser. No. 766,982
Int. Cl. C07d 27/52
U.S. Cl. 260—326                    5 Claims

ABSTRACT OF THE DISCLOSURE

Organotin imides that have the structural formula

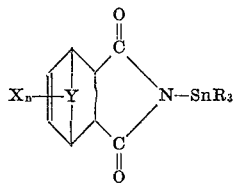

or

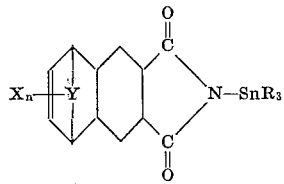

wherein each R represents phenyl or an alkyl group having from 4 to 8 carbon atoms, X represents an alkyl group having from 1 to 4 carbon atoms, an alkenyl group having from 4 to 8 carbon atoms, halogen, or phenyl; Y represents methylene, ethylene, chloromethylene, or chloroethylene; and $n$ represents an integer in the range of 0 to 4 can be used to control the growth of undesirable plants, insects, and fungi. Illustrative of these compounds are N-tri-n-butyltin chlorendic imide and N-triphenyltin chlorocyclic imide.

---

This invention relates to novel biocidal compounds and to their use in the control of various plant and animal pests. More particularly, it relates to the control of the growth of undesirable fungi, plants, and insects using pesticidal compositions that contain certain organotin imides as their biocidally-active ingredients.

In accordance with this invention, it has been found that certain organotin imides have unusual and valuable activity as fungicides, insecticides, and selective herbicides. These compounds may be represented by the structural formula

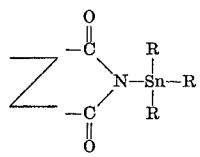

wherein each R represents phenyl or an alkyl group having from 4 to 8 carbon atoms; Z represents a divalent cyclic group having the structure

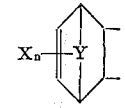

or

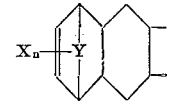

X represents an alkyl group having from 1 to 4 carbon atoms, an alkenyl group having from 4 to 8 carbon atoms, halogen, or phenyl; Y represents methylene, ethylene, chloromethylene, or chloroethylene; and $n$ represents an integer in the range of zero to four. Illustrative of these compounds are the following:

N-tri-n-butyltin 1,4-endomethylene-dihydro-2,3-phthalimide,
N-tri-n-butyltin 1,4,5,6,7,7-hexachloro-1,4-endomethylene-dihydro-2,3-phthalimide (chlorendic imide),
N-trihexyltin 1,4,5,6,7,7-hexachloro-1,4-endomethylene-dihydro-2,3-phthalimide (chlorendic imide),
N-tri-n-octyltin 3-methyl-6-isopropyl-3,6-endoethylene-dihydro-2,3-phthalimide,
N-triphenyltin 5,6,7,8,9,9-hexachloro-5,8-endomethylene-octahydro-2,3-naphthalimide (chlorocyclic imide),
N-tri-n-butyltin 5,6,7,8-tetramethyl-5,8-endoethylene-octahydro-2,3-naphthalimide,
trihexyltin 5,6,7,8-tetraphenyl-5,8-endomethylene-octahydro-2,3-naphthalimide, and the like.

A single organotin imide or a mixture of two or more of these compounds may be present in the pesticidal compositions of this invention.

The novel pesticidal compounds may be prepared by any suitable and convenient procedure. For example, they may be prepared by the reaction of the appropriate dicarboxylic acid imide with a trialkyl or triaryl tin oxide or hydroxide. The imides are readily prepared by bubbling anhydrous ammonia through a solution of a dicarboxylic acid anhydride. The dicarboxylic acid anhydrides that can be used as the starting materials in the preparation of the pesticidal compounds include those obtained by the condensation of maleic anhydride with a diene, such as 1,3-hexadiene, 2,4 - hexadiene, isoprene, 1,1,3-trimethylbutadiene, allo-ocimene, and the like as well as those obtained by the reaction of tetrahydrophthalic anhydride or a substituted tetrahydrophthalic anhydride with a polyhalocyclopentadiene.

The biocidal compounds of this invention may be applied to a wide variety of fungi, plants, insects, and other pests to control or inhibit their growth. Each of the organotin imides has been found to be useful in the control of the growth of fungi. In addition some of them, for example, N-tri-n-butyltin chlorendic imide, are useful as selective herbicides, while others, including N-tri-n-butyltin chlorocyclic imide, are useful as insecticides.

In a preferred embodiment of the invention, the organotin imides are used to control the growth of fungi on living plant materials intended for human or animal consumption. In this application, the compounds are applied by known techniques to plants, to plant seeds, or to the soil in which plants are growing or are to be grown to control the growth of a wide variety of plant pathogens, including those responsible for early blight and late blight of tomatoes, powdery mildew of beans, and other serious crop diseases.

The organotin imides may be used as such in the control of fungi on living plants, or they may be used in combination with an inert carrier that facilitates the dispensing of dosage quantities of the compounds and assists in their absorption by the organism whose growth is to be controlled. The pesticidal compounds may be mixed with or deposited upon inert particulate solids, such as fullers earth, talc, diatomaceous earth, hydrated calcium silicate, kaolin, and the like, to form dry particulate compositions. Such compositions may, if desired, be dispersed in water with or without the aid of a surface-active agent. The compounds are preferably dispensed in the form of solutions or dispersions in inert organic solvents, water, or mixtures of inert organic solvents and water or as oil-in-water emulsions. The concentrations of the fungicide in the compositions may vary within wide limits and depends upon a number of factors, the most important of which are the type or types of organisms being treated and the rate at which the composition is to be applied. In most cases the composition contains approximately 0.1 percent to 85 percent by weight of one or more of the aforementioned organotin imides. If desired, the compositions may also contain other fungicides, such as sulfur, the metal dimethyl dithiocarbamates, and the metal ethylene bis(dithiocarbamates); insecticides, such as chlordane, benzene hexachloride, and DDT; or plant nutrients such as urea, ammonium nitrate, and potash.

The amount of the compositions that is applied is dependent upon such factors as the species of plants being treated and the pathogen whose control is desired and is the amount which will inhibit the growth of the pathogen while causing little or no injury of the plants. About 1 pound to 200 pounds of the organotin imides is ordinarily applied per acre, with particularly good results being obtained when 5 pounds to 35 pounds per acre is used.

In another preferred embodiment of the invention, the organotin imides are used to impart fungal resistance to a wide variety of surface-coating compositions including both organic solvent-based and water-based coating systems. They are particularly valuable as fungicides in coatings that contain as their resinous binder either an oleoresinous material or a water-insoluble synthetic linear addition polymer.

The oleoresinous materials that may be used as binders in these water-based and solvent-based surface-coating compositions include drying oils, such as linseed oil, tung oil, soybean oil, dehydrated castor oil, safflower oil, or fish oil; bodied drying oils; blends of drying oils or bodied drying oils with a resin component, such as limed rosin, anester gum, or a phenolic resin; oleoresinous varnishes formed by heating one of the aforementioned resins with one or more drying oils or bodied drying oils; and alkyd resins, which are resinous products resulting from the reaction of a polyhydric alcohol, such as pentaerythritol or glycerol, with a dicarboxylic acid, such as phthalic anhydride, and fatty acids. Alternatively, the water-based composition may contain as binder a synthetic linear addition polymer. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition plymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acids esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the organotin imide need be present in these surface-coating compositions. As little as 0.10% of organotin imide, based on the weight of the composition, will bring about an appreciable improvement in the resistance of the composition to attack by fungi. Approximately 5.0% or more of the fungicide, based on the weight of the composition, can be used, but these larger amounts generally do not provide further improvement in the properties of the surface-coating compositions and for this reason are not ordinarily used. While the amount of the fungicide that will provide optimum protection for the surface-coating compositions depends upon such factors as the choice of organotin imide, the choice of resinous binder and other components of the composition and the amount of each that is employed, and the application for which the coating composition is intended, in most cases about 0.25 percent to 2.0 percent of organotin imide, based on the weight of the surface-coating composition, is used.

In addition to the resinous binder and the fungicide, the surface-coating compositions of the present invention may contain various auxiliary materials, such as pigmets, extenders, solvents, dyes, defoaming agents, driers, emulsifying agents, dispersing agents, plasticizers, other fungicides, bactericides, and corrosion inhibitors, in the amounts ordinarily used for these purposes.

The organotin imide that is used as the fungicide may be incorporated into the surface-coating composition by any convenient procedure. For example, it can be combined with the pigments and various other components to form a pigment phase that is then mixed with the resinous binder and water or an organic solvent to form the surface-coating composition. Alternatively, it can be added to a composition that contains the resinous binder, pigment, and water or organic solvent. The organotin imide can be added as such to the other components of the surface-coating composition, or it can be added as a solution of the organotin imide in a solvent, such as an alcohol, ether, or ketone.

The invention is further illustrated by the examples that follow. In these examples, all percentages are percentages by weight.

EXAMPLE 1

(A) Anhydrous ammonia was bubbled through a solution of 139.2 grams of chlorendic anhydride (1,4,5,6,7,7-hexachloro-1,4-endomethylene-dihydro-2,3-phthalic anhydride) in 450 ml. of toluene which was maintained at 80° to 105° C. until the obsorption of ammonia had ceased. During this absorption step, which required 2.75 hours 7.1 grams of ammonia was absorbed.

The reaction mixture was heated at its reflux temperature for a few minutes and then cooled to room temperature. After standing overnight, the reaction mixture was cooled in an ice bath and then filtered. The solid product was washed with cold toluene and dried at 100° C./1 mm. After recrystallization from 450 ml. of a 9:1 water-alcohol mixture, there was obtained 124.2 grams of chlorendic imide, which melted at 277°–279° C. (literature, 280° C.).

(B) A mixture of 37 grams (0.1 mole) of chlorendic imide, 29.8 grams (0.05 mole) of tri-n-butyltin oxide, and 300 ml. of benzene was heated at its reflux temperature with stirring for one hour, during which time 0.95 ml. of water was collected in the Dean-Stark trap. After cooling, the solvent was removed by heating the reaction mixture at 60° C./1 mm. There was obtained 64.6 grams of N-tri-n-butyltin chlorendic imide, which melted at 97°–114° C. and which contained 17.95% Sn (calculated, 18.1% Sn).

EXAMPLE 2

A mixture of 18.5 grams (0.05 mole) of chlorendic imide, 18.4 grams (0.05 mole) of triphenyltin hydroxide, and 150 ml. of toulene was heated at its reflux temperature with stirring for 1.5 hours. The reaction mixture was cooled to room temperature, allowed to stand overnight, and filtered. After washing with toluene and drying, there was obtained 24.7 grams of N-triphenyltin chlorendic imide, which melted at 206°–207.5° C. and which contained 16.83% Sn and 28.5% Cl (calculated, 16.51% Sn and 29.59% Cl).

EXAMPLE 3

(A) Anhydrous ammonia was bubbled through a solution of 106.8 grams of chlorocyclic anhydride (5,6,7,8,9,9-hexachloro - 5,8 - endomethylene - octahydro - 2,3-naphthalic anhydride) in 300 ml. of toluene which was maintained at 85° to 100° C. until the absorption of ammonia had ceased. During the absorption step, which required 1.75 hours, 4.6 grams of ammonia was absorbed.

The reaction mixture was allowed to stand overnight at room temperature. It was then diluted with toluene, cooled in an ice bath, and filtered. The solid product was washed with toluene and dried at 60° C./1 mm. There was obtained 93.5 grams of chlorocyclic imide.

(B) A mixture of 42.4 grams (0.1 mole) of chlorocyclic imide, 29.8 grams (0.05 mole) of tri-n-butyltin oxide, and 300 ml. of benzene was heated at its reflux temperature for one hour, during which time 0.855 ml. of water was collected in the Dean-Stark trap. The reaction mixture was cooled, and the solvent was removed under reduced pressure. There was obtained 70.5 grams of N-tri-n-butyltin chlorocyclic imide, which contained 41.3% C, 5.02% H, and 28.6% Cl (calculated, 42.2% C, 4.95% H, and 29.9% Cl).

EXAMPLE 4

A mixture of 21.2 grams (0.05 mole) of chlorocyclic imide, 18.4 grams (0.05 mole) of triphenyltin hydroxide, and 150 ml. of toluene was heated at its reflux temperature with stirring for 1.5 hours, during which time 0.9 ml. of water was collected in the Dean-Stark trap. The reaction mixture was cooled to room temperature, allowed to stand overnight at room temperature cooled in an ice bath, and filtered. There was obtained 38.3 grams of tri-phenyltin chlorocyclic imide, which contained 47.5% C, 3.71% H, 2.55% N, 26.7% Cl, and 15.4% Sn (calculated, 48.2% C, 2.98% H, 1.82% N, 27.6% Cl, and 15.4% Sn).

EXAMPLE 5

Solutions were prepared by dissolving 100 mg. portions of the products of Examples 1–4 in 10 ml. of acetone that contained 2000 p.p.m. of a polyoxyethylene ether of sorbitan trioleate. The acetone solutions were dispersed in 90 ml. portions of distilled water to form aqueous solutions that contained 1000 p.p.m. of the organotin imide. More dilute solutions were prepared by adding distilled water to these solutions.

EXAMPLE 6

A series of tests was carried out in which the products of Examples 1 and 3 were evaluated as selective herbicides. The tests were carried out by spraying seedlings of various plant species with solutions prepared according to the process of Example 5 and observing the results 43 days after this treatment.

In Table I a numerical scale is used to show the herbicidal activity of the compounds. On this scale, "0" indicates no injury to the plants; "1"–"3" indicates slight injury; "4"–"6" indicates moderate injury; "7"–"9" indicates severe injury; and "10" indicates that all of the plants were killed.

TABLE I.—ACTIVITY OF ORGANOTIN IMIDES AS SELECTIVE HERBICIDES

| Plant species | N-tri-n-butyltin chlorendic imide | | | N-tri-n-butyltin chlorocyclic imide | | |
|---|---|---|---|---|---|---|
| | 10#/A. | 5#/A. | 2.5#/A. | 10#/A. | 5#/A. | 2.5#/A. |
| Clover | 10 | 9 | 3 | 10 | 7 | 5 |
| Soybean | 10 | 5 | 2 | 9 | 7 | 7 |
| Sugar beet | 10 | 10 | 10 | 10 | 9 | 6 |
| Cotton | 9 | 7 | 6 | 10 | 10 | 10 |
| Corn | 9 | 6 | 5 | 5 | 5 | 5 |
| Oats | 9 | 6 | 2 | 7 | 6 | 4 |
| Mustard | 10 | 10 | 10 | 10 | 10 | 10 |
| Morning glory | 10 | 10 | 9 | 10 | 10 | 9 |
| Buckwheat | 10 | 9 | 8 | 10 | 10 | 10 |
| Rye grass | 9 | 2 | 2 | 8 | 2 | 0 |
| Crab grass | 10 | 2 | 2 | 7 | 6 | 0 |
| Foxtail | 9 | 2 | 2 | 9 | 9 | 0 |

EXAMPLE 7

In a series of experiments in which organotin imides were applied to plants infested with insects, the following results were obtained:

TABLE II

| Ex. No. | Biocide | Rate of application (p.p.m.) | Percent control of insect | | | |
|---|---|---|---|---|---|---|
| | | | Mexican bean beetle | Southern army worm | Pea alphid | 2-Spotted spider mite |
| A | Product of Ex. 1 | 250 | 80 | 33 | 93 | 100 |
| | | 125 | 33 | 13 | 10 | 48 |
| B | Product of Ex. 2 | 1,000 | 100 | 40 | | |
| | | 250 | 100 | | | |
| C | Product of Ex. 3 | 1,000 | 100 | | 100 | |
| | | 750 | 100 | 13 | 100 | 100 |
| | | 500 | 93 | 13 | 100 | 100 |
| | | 250 | 93 | | 100 | 100 |
| | | 125 | 93 | | 60 | 100 |
| | | 50 | 33 | | 37 | 100 |
| | | 10 | 13 | | 10 | 51 |

Plants were sprayed until the liquid dripped from the leaves with aqueous solutions prepared by the procedure of Example 5. When the plants had dried, they were sprayed with a suspension of spores of a plant pathogen. About 10 days after treatment, the degree of suppression of the disease was noted. The following results were obtained:

TABLE II

| Ex. No. | Fungicide | Concentration (p.p.m.) | Percent control of— | | | |
|---|---|---|---|---|---|---|
| | | | Early blight of tomatoes | Late blight of tomatoes | Powdery mildew of beans | Leaf rust of wheat |
| A | Product of Ex. 2 | 1,000 | 72 | | 100 | |
| | | 100 | | | 100 | |
| B | Product of Ex. 3 | 100 | | 100 | | 97 |
| | | 30 | | 49 | | 60 |
| C | Product of Ex. 4 | 1,000 | 81 | 80 | 100 | |
| | | 100 | | | 100 | |
| | | 20 | | | 100 | |

EXAMPLE 9

Separate lots of sterilized soil were inoculated with plant pathogens. The inoculated soil was placed in 4-ounce containers, and the soil in each container was drenched with 30 ml. of an aqueous solution prepared according to the procedure of Example 5. After incubation for two days at 70° F., the amount of mycelial growth on the surface of the soil was noted. The following results were obtained:

TABLE IV

| Ex. No. | Fungicide | Rate, #/acre | Percent Control of— | | | |
|---|---|---|---|---|---|---|
| | | | Sclerotium rolfsii | Pythium Sp. | Rhizoctonia solani | Fusarium oxysporum |
| A | Product of Ex. 3 | 100 | 98 | 95 | 100 | |
| | | 50 | 71 | | | |
| B | Product of Ex. 4 | 300 | 75 | 30 | 90 | 30 |

EXAMPLE 10

A polyvinyl acetate emulsion plant was prepared by mixing together the following materials:

|   | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| Aqueous solution containing 55% by weight of polyvinyl acetate | 350 |

To samples of this paint were added the amounts of N-tri-n-butyltin chlorendic imide indicated in Table V. For comparative purposes, samples were prepared that contained phenylmercuric acetate as the fungicide.

The following standard testing procedure was used: Pieces of drawdown paper were dipped into each of the treated paints, dried for 24 hours, and again dipped into the paint. The coated paper samples were cut into 1¼" squares. Each of the coated paper squares thus prepared was placed on a plate of malt and mycophil agar, which had previously been inoculated with 1 ml. of a suspension of the test organism. The plates, prepared in triplicate, were incubated at 28° C. and observed weekly. The growth was estimated according to the following key, and the results of the replicate plates were averaged:

ZO=Zone of inhibition in mm.
0=No zone of inhibition
— =Sample not tested

The results obtained are summarized in Table V.

TABLE V

| | Fungicide | | | | | | | | |
|---|---|---|---|---|---|---|---|---|---|
| | N-tri-n-butlytin chlorendic imide | | | | Phenylmercuric acetate | | | | |
| Percent fungicide | 0.1% | 0.5% | 1% | 2% | .1% | 0.5% | 1% | 2% | None |
| Effect on color of paint | none | none | none | none | none | none | none | none | none |
| Fungicidal Activity: | | | | | | | | | |
| Pullularia pullulans | ZO-1 | ZO-3 | ZO-3 | ZO-4 | ZO-5 | ZO-10 | ZO-14 | ZO-16 | 0 |
| Penicillium crustosum | ZO-1 | ZO-2 | ZO-2 | ZO-3 | ZO-3 | ZO-6 | ZO-9 | ZO-12 | 0 |
| Aspergillus niger | 0 | ZO-3 | ZO-3 | ZO-2 | ZO-12 | ZO-16 | ZO-16 | ZO-20 | 0 |
| Bacterial Activity: | | | | | | | | | |
| Bacillus subbilis | — | — | ZO-4 | ZO-5 | — | — | ZO-10 | ZO-10 | 0 |
| Pseudomonas aeruginosa | — | — | ZO-1 | ZO-2 | — | — | ZO-8 | ZO-10 | 0 |

EXAMPLE 11

To samples of the polyvinyl acetate emulsion paint whose preparation was described in Example 10 and an acrylic emulsion paint were added 2% by weight of a fungicide. Pieces of draw-down paper were dipped into each of the treated paints, dried for 24 hours, and again dipped into the paint. After a 24 hour drying period, one of the samples coated with each of the treated paints was leached for 24 hours in accordance with Method 5831, CCC-T-1916. The coated paper samples were cut into 1¼" squares, which were evaluated by the procedure described in Example 10.

The acrylic paint that was used in this test was prepared by mixing together the following materials:

|   | Parts by weight |
|---|---|
| Water | 250 |
| Acrylic acid resin (100 solids) (Acryloid B-66) | 385 |
| Monoethyl ether of ethylene glycol | 259 |
| Titanium dioxide | 143 |
| Aluminum silicate | 45 |
| Magnesium silicate | 98 |

The results obtained are summarized in Table VI. In this table

ZO=Zone of inhibition in mm.
0=No zone of inhibition, no growth on paint film
1-9=Increasing amounts of growth on paint film
10=Paint film completely covered by growth
*=Weeks of incubation at 28° C. and 90% relative humidity

TABLE VI

| | Fungicide | | |
|---|---|---|---|
| | N-tri-n-butyltin chlorendic imide | Phenyl-mercuric acetate | None |
| Acrylic paint | | | |
| Effect on color of— | | | |
| Liquid paint | (¹) | (¹) | |
| Paint film | (¹) | (¹) | |
| pH | 9.3 | 9.4 | 9.5 |
| Fungicidal activity | | | |
| *A. niger*, unleached— | | | |
| 1 week* | 0 | ZO-8 | 10 |
| 2 weeks | 0 | ZO-8 | 10 |
| 4 weeks | 0 | ZO-7 | 10 |
| Leached— | | | |
| 1 week* | 0 | ZO-7 | 10 |
| 2 weeks | 0 | ZO-7 | 10 |
| 4 weeks | 0 | ZO-7 | 10 |
| *P. pullulans*, unleached— | | | |
| 1 week* | 0 | 0 | 10 |
| 2 weeks | 0 | 0 | 10 |
| 4 weeks | 2 | 0 | 10 |
| Leached— | | | |
| 1 week* | 0 | 0 | 10 |
| 2 weeks | 0 | 0 | 10 |
| 4 weeks | 1 | 1 | 10 |
| Yellowness index: | | | |
| Initial | 0.8 | 1.4 | 0.4 |
| 4 weeks | 1.3 | 1.2 | 0.7 |
| Polyvinyl Acetate Paint | | | |
| Effect on color of— | | | |
| Liquid paint | (¹) | (¹) | (¹) |
| Paint film | (¹) | (¹) | (¹) |
| pH | 7.6 | 7.0 | 7.2 |
| Fungicidal activity | | | |
| *A. niger*, unleached— | | | |
| 1 week* | ZO-5 | ZO-13 | 10 |
| 2 weeks | ZO-5 | ZO-8 | 10 |
| 4 weeks | ZO-5 | ZO-8 | 10 |
| Leached— | | | |
| 1 week* | ZO-5 | ZO-9 | 10 |
| 2 weeks | ZO-5 | ZO-6 | 10 |
| 4 weeks | ZO-3 | ZO-6 | 10 |
| *P. pullulans*, unleached— | | | |
| 1 week* | ZO-1 | 0 | 10 |
| 2 weeks | ZO-1 | 0 | 10 |
| 4 weeks | ZO-1 | 0 | 10 |
| Leached— | | | |
| 1 week* | ZO-2 | 0 | 10 |
| 2 weeks | ZO-1 | 0 | 10 |
| 4 weeks | ZO-1 | 0 | 10 |
| Yellowness index: | | | |
| Initial | 2.1 | 1.3 | 1.6 |
| 4 weeks | 2.1 | 1.5 | 2.0 |

¹ None.

From the data in Tables V and VI, it will be seen that N-tri-n-butyltin chlorendic imide is an effective biocide for paints, and particularly for such water-based paints as polyvinyl acetate paints and acrylic paints. It imparted to these paints excellent resistance to attack by fungi and bacteria which was maintained even after leaching. In addition this organotin imide did not affect the color or the pH of the paints. Unlike those containing phenylmercuric acetate, the paint films containing N-tri-n-butyltin chlorendic imide did not undergo any black or gray staining when they were exposed to hydrogen sulfide.

Each of the other organotin imides disclosed also has biocidal properties that make it useful in many industrial and agricultural applications.

The terms and expressions that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:

1. An organotin imide having the structural formula

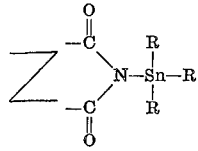

wherein each R represents a member selected from the group consisting of phenyl and alkyl groups having from 4 to 8 carbon atoms; Z represents a divalent cyclic group selected from the group consisting of

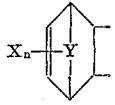

and

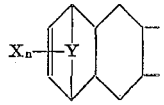

X represents a member selected from the group consisting of alkyl groups having from 1 to 4 carbon atoms, alkenyl groups having from 4 to 8 carbon atoms, halogen, and phenyl; Y represents a member selected from the group consisting of methylene, ethylene, chloromethylene, and chloroethylene; and $n$ represents an integer in the range of zero to four.

2. The compound according to claim 1 that is N-tri-n-butyltin 1,4,5,6,7,7 - hexachloro - 1,4-endomethylene-dihydro-2,3-phthalimide.

3. The compound according to claim 1 that is N-triphenyltin 1,4,5,6,7,7-hexachloro-1,4-endomethylene-dihydro-2,3-phthalimide.

4. The compound according to claim 1 that is N-tri-n-butyltin 5,6,7,8,9,9-hexachloro-5,8-endomethylene-octahydro-2,3-naphthalimide.

5. The compound according to claim 1 that is N-triphenyltin 5,6,7,8,9,9 - hexachloro-5,8-endomethylene-octahydro-2,3-naphthalimide.

References Cited

UNITED STATES PATENTS 2,727,917  12/1955  Mack et al. _____ 260—429

ALEX MAZEL, Primary Examiner

J. A. NARCAVAGE, Assistant Examiner

U.S. Cl. X.R.

71—95, 97; 106—15; 260—429.7; 424—245